United States Patent [19]

Costahaude

[11] 4,149,432

[45] Apr. 17, 1979

[54] CYCLE HANDLEBAR LEVER FOR BRAKE OR CLUTCH CONTROL

[76] Inventor: Mark A. Costahaude, 2041 Avenida Placida #4, SimiValley, Calif. 93063

[21] Appl. No.: 859,328

[22] Filed: Dec. 12, 1977

[51] Int. Cl.$^2$ .......................... B62K 23/06; B62L 3/02
[52] U.S. Cl. ..................................................... 74/489
[58] Field of Search ................................. 74/488, 489

[56] References Cited

U.S. PATENT DOCUMENTS

| | | | |
|---|---|---|---|
| Re. 28,943 | 8/1976 | Guyton | 74/489 |
| 3,720,111 | 3/1973 | Guyton | 74/489 |

Primary Examiner—Allan D. Herrmann
Attorney, Agent, or Firm—Gene W. Arant

[57] ABSTRACT

On a motorcycle handlebar having a handgrip, a control lever pivotally supported on the handlebar normally extends outward in an angular position relative to the handgrip, but may be selectively pivoted toward the handgrip in order to actuate a brake or clutch of the vehicle. The actuating handle of the lever has an intermediate portion of its length which, when the lever is pivoted inwardly, engages the surface of the handgrip. This intermediate portion of the lever handle provides a hook which may be grasped by the forefinger and middle finger of the hand of the rider, while he is keeping the palm of his hand and the two smallest fingers in firm engagement with the handgrip. The rearward extremity of the lever handle is offset in an outwardly direction relative to the hook portion so that, when the lever handle is pivoted inwardly, the two smallest fingers of the rider are not mashed by it.

3 Claims, 4 Drawing Figures

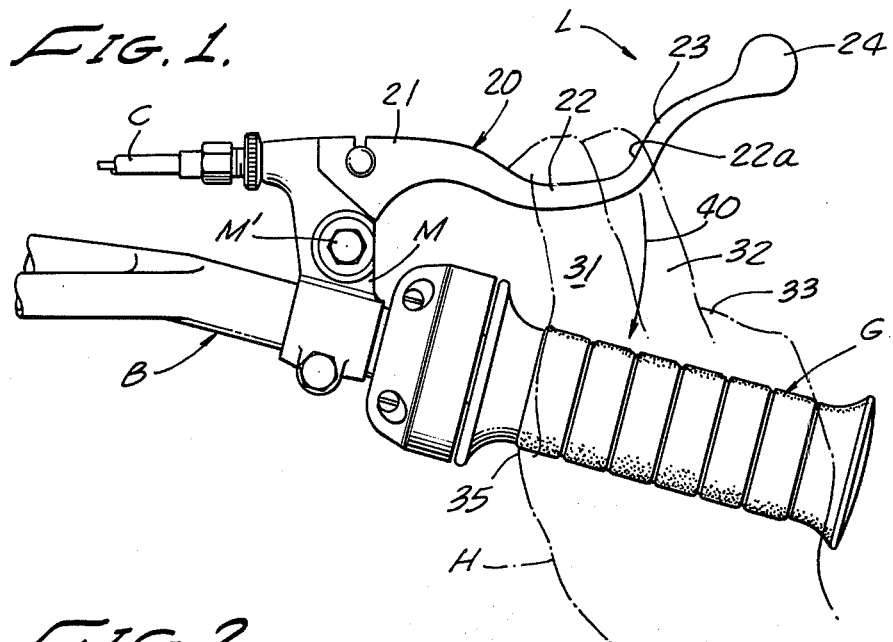
FIG. 1.
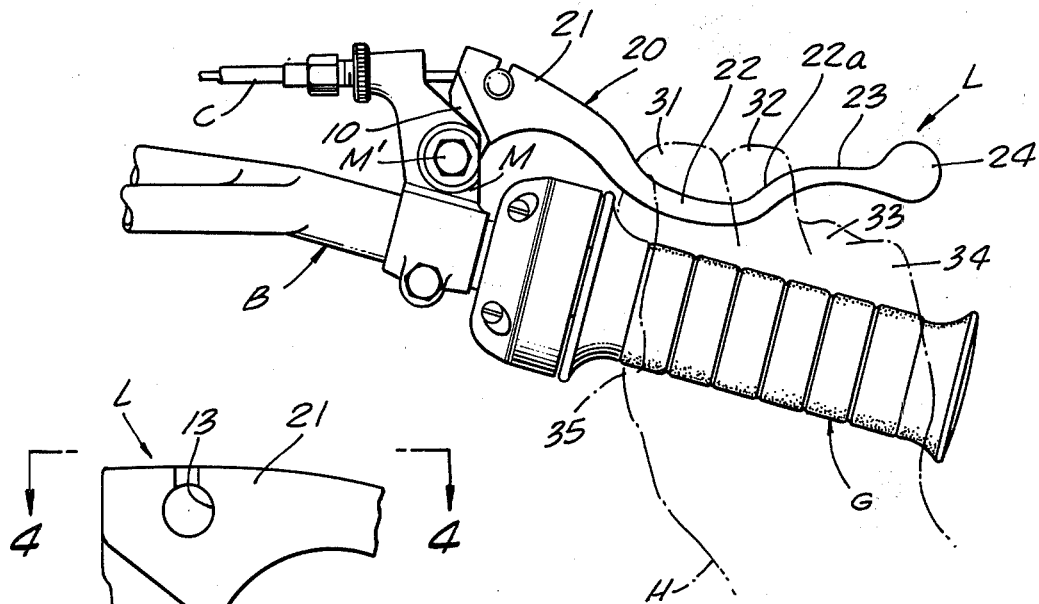
FIG. 2.
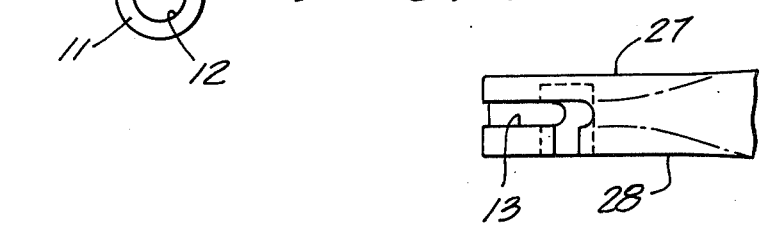
FIG. 3.
FIG. 4.

4,149,432

CYCLE HANDLEBAR LEVER FOR BRAKE OR CLUTCH CONTROL

BACKGROUND OF THE INVENTION

1. Field of the Invention

The present invention relates to an improvement in the hand-operated controls for a motorcycle, and more specifically, to a control lever that is used for hand actuation of a brake or clutch of the motorcycle. Specifically, the design of the control lever facilitates concurrent operation by a single hand of the rider of both the control lever and a rotatable handgrip with which it is associated.

2. Description of the Prior Art

Conventional motorcycles have handlebars equipped with two handgrips, one of which may have a fixed position but the other of which is usually rotatable for controlling the throttle of the vehicle motor. In addition, the conventional motorcycle is equipped with two pivotally mounted control levers, one associated with each handgrip. One control lever is utilized to control the clutch of the vehicle, while the other is utilized for actuating the front wheel brake.

The pertinent prior art includes U.S. Pat. No. 3,720,111 issued Mar. 13, 1973 to Guyton and later reissued as U.S. Pat. No. Re. 28,943. The Guyton patent shows a control lever having an actuating handle which is curved in such a way that it may be manually grasped by the three smallest fingers of the motorcycle rider, while the forefinger of the same hand remains in place on the handgrip without being engaged by the handle of the depressed lever.

SUMMARY OF THE INVENTION

According to the present invention I provide a curved lever handle which is somewhat the reverse of that shown by Guyton, but not precisely so. My lever handle is designed to be operated by the two large fingers of the rider's hand, i.e., the forefinger and middle finger. At the same time the two smallest fingers remain in engagement with the handgrip, and they are not mashed by the inward pivoting movement of the lever handle. More specifically, the curved shape of my lever is such that the middle finger of the motorcycle rider engages a curved portion of the actuating handle which provides a secure pulling force, and also prevents any longitudinal sliding movement of the forefinger and middle finger along the actuating handle.

DRAWING SUMMARY

FIG. 1 is an elevation view of a motorcycle handlebar carrying my new control lever, in its normal position, and showing in dotted lines the hand of the operator as the lever handle is about to be actuated.

FIG. 2 is a view like FIG. 1 but showing the lever after it has been pivoted inwardly to a position where it nearly engages the handgrip.

FIG. 3 is a fragmentary elevational view of the forward end of the lever.

FIG. 4 is a top plan view of the lever taken on the line 4—4 of FIG. 3.

DETAILED DESCRIPTION

The motorcycle handlebar B has both left and right handgrips, and only the handgrip G for the righthand is illustrated in the present drawing. As is conventional in some motorcycles, the handgrip G may be rotatable for controlling the vehicle throttle, thereby providing the engine power which drives the vehicle forward.

Control lever L is of a somewhat L-shaped configuration, the short leg of the L providing an operating arm 10 while the long leg of the L provides an actuating handle 20. It is the specific configuration of actuating handle 20 which constitutes the novel subject matter of the present invention.

Operating arm 10 of the lever L has a pivot support 11 on its inner end, in which a transverse opening 12 is formed. Mounting means M includes a bolt M' which passes through the opening 12, thereby providing a pivotal support of the control lever L relative to the handlebar B.

At the outer corner of control lever L a slot 13 of complex configuration is formed, which acts as a means for securing a control line C to the lever L to be actuated thereby. In the normal position of the lever, as shown in FIG. 1, the lever actuating handle 20 is positioned essentially as an extension of the control line C. When the lever handle is pulled inwardly towards the handgrip G, as shown in FIG. 2, the operating arm 10 pivots about the mounting bolt M', thereby applying a tightening force to the control line C.

Actuating handle 20 of the control lever L has a forward portion 21 adjacent the slot 13, and rearwardly of that forward portion there is an intermediate portion 22 of its length which is offset inwardly towards the handgrip G. Then the rearward portion 23 of the handle 20 is offset outwardly from the intermediate portion 22, being approximately in line with the forward portion 21, but angled outwardly relative thereto so that the enlarged tip end 24 of the handle 20 is further from the handgrip G than is the handle portion 23. As seen in FIGS. 1 and 2, the intermediate portion 22 of the handle is about ⅓ of the entire length of the handle, and its ends curve smoothly into the forward end portion 21 and the rearward end portion 23, respectively. The intermediate portion 22 of the handle provides a hook which is capable of being conveniently grasped by the forefinger 31 and middle finger 32 of the hand H of the motorcycle rider.

The curved portion 22a which joins the hook 22 and the rearward portion 23 of the handle is of particular significance. When the forefinger 31 and middle finger 32 grasp the hook 22 as shown in FIG. 1, their longitudinal position on handle 20 is constrained by the curved portion 22a. As these two fingers are pulled inwardly in order to actuate the control lever, the curved portion 22a of the handle follows an arcuately curved path as indicated by arrow 40 in FIG. 1. This movement in turn causes the middle finger 32 of the motorcycle rider to follow the same curved path. The result is that the two large fingers which are used to actuate the lever handle have a secure and effective engagement with the handle, and will not slide longitudinally along its surface, even if it is wet or muddy.

As shown in FIG. 2 the rider's hand H is kept in secure engagement with handgrip G at all times, by means of the small fingers 33, 34 and the thumb 35. Not only does the rider maintain a secure hold on the handgrip G in order to maintain his own position on the vehicle, but he may also rotatably actuate the handgrip G at the very same time that he is pivoting the lever L inwardly.

The control lever L is preferably integrally formed as a single member. A rigid plastic material may be used for this purpose, or an aluminum alloy, or other materials as may be desired. The rounded tip end 24 of control lever 20 is provided as a safety feature, as is conventional. The thickness of lever L between its side surfaces 27, 28 (FIG. 4) is preferably about one-half inch.

OPERATION

As already indicated in the foregoing description, the normal operation of the control lever L is as follows. The motorcycle rider keeps the palm of his hand firmly in engagement with handgrip G, being able to do this by also keeping the smallest fingers 33, 34 and the thumb 35 in secure engagement with the handgrip. The forefinger 31 and middle finger 32 are stretched outward and hooked over the hook portion 22 of the lever handle 20, when it is desired to actuate the lever. Then these two large fingers are pulled inward towards the handgrip, along a curved path as indicated by the arrow 40. When hook portion 22 of handle 20 comes into engagement with the handgrip, the offset rearward end portion 23 of the handle is still sufficiently far away from the handgrip so that the smallest fingers 33, 34 of the rider's hand are not mashed thereby.

Alternatively, when the handle 20 has been pivoted partially inward toward the handgrip G, the rider may then lift his smallest fingers 33, 34 from the handgrip and place them about the exterior surface of the handle portion 23. The smallest fingers then aid in the closing action that is required in pivoting the handle 20 to its fully inward position. In this connection it is important to note that the longer and more powerful fingers 31, 32 are used to reach the greatest distance, and initially pull the load alone, but in the closing movement the shorter and weaker fingers may be used to aid them. This is important because as the tension on control line C builds up, the pulling force required to actuate the lever handle increases.

There is also a special situation in which the operation of my invention is extremely important, if not critical. That is the situation where the motorcycle rider is about to encounter an undesired obstacle such as a tree, a bush, or an embankment. If the control lever L were to strike the object, then not only would the control lever be actuated in a very abrupt fashion, but the fingers of the rider could be mashed. Utilizing the present invention, however, the rider upon anticipating the possibility of hitting such an undesired object may simply extend his two large fingers over the hook portion of the lever handle 20, and pull the lever partly inward to a position such as that shown in FIG. 2. All of the fingers are then protected against mashing. The amount of exposure of the lever to being hit by the undesired object is minimized. And at the same time, assuming that it is the front wheel brake that is controlled by control line C, the brake has been partially applied in a cautionary movement.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What is claimed is:

1. In a motorcycle, the combination comprising:
a handlebar having a handgrip on one of its extremities;
a control lever including means providing a pivot support, an actuating handle extending in a generally linear direction from said pivot support, and an operating arm whose length is short compared to the length of said actuating handle and which extends from said pivot support in a direction substantially perpendicular to said actuating handle;
means mounting said pivot support of said lever upon said handlebar forwardly of said handgrip so that said actuating handle may be positioned at an angle of about 45 degrees relative to said handgrip, or may instead be selectively pivoted towards said handgrip to a position generally parallel thereto;
a control line for the motorcycle brake or clutch secured to the outer end of said operating arm of said lever so that a pivotal movement of said actuating handle toward said handgrip imparts a pulling force upon said control line; and
said actuating handle being of such configuration that when pivoted inward towards said handgrip an intermediate portion of its length engages the surface of said handgrip, the rearward extremity of said actuating handle being outwardly offset relative to said intermediate portion thereof so that the two smallest fingers of the motorcycle rider may remain in engagement with said handgrip without being mashed by said actuating handle, and said intermediate portion of the length of said actuating handle providing on the outer surface thereof a downwardly curved hook which is of sufficient length to be conveniently grasped by both the middle finger and forefinger of the motorcycle rider;
whereby the motorcycle rider may either leave all four of his fingers in engagement with the handgrip, or may extend his middle finger and forefinger above said hook portion of said actuating handle in order to operate said lever while keeping his two smallest fingers in engagement with said handgrip, or alternatively when said lever has been partially operated by means of his middle finger and forefinger may then extend his two smallest fingers for gripping the outer surface of said offset rearward extremity of said actuating handle in order to completely draw said actuating handle toward the handgrip.

2. Apparatus as claimed in claim 1 wherein said control lever is integrally formed of rigid material and has a somewhat L-shaped configuration, the short arm of the L providing said operating arm and said pivot support being at the outer extremity thereof.

3. A control lever for a motorcycle comprising a member integrally formed of rigid material and having a somewhat L-shaped configuration, said member having at the extremity of the short arm of the L a transverse opening therethrough to provide a pivot support point, having means provided at the outer corner of the L for securement thereto of a control line which is positioned essentially as an extension of the long arm of the L, an intermediate portion of the long arm of the L comprising about one-third of its length being offset inwardly and having smoothly curved ends on its exterior surface for receiving the middle finger and forefinger of a motorcycle rider in gripping engagement therewith but without longitudinal sliding movement thereon, and the extreme end of the long arm of the L being angled slightly outwardly relative to the forward portion thereof.

* * * * *